(12) United States Patent
Wallace et al.

(10) Patent No.: US 10,919,428 B2
(45) Date of Patent: Feb. 16, 2021

(54) POWERED SLIDING PLATFORM ASSEMBLY

(71) Applicant: Ford Global Technologies, LLC, Dearborn, MI (US)

(72) Inventors: Michael Duane Wallace, Chesterfield, MI (US); Bernard D. Nefcy, Novi, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 96 days.

(21) Appl. No.: 14/821,300

(22) Filed: Aug. 7, 2015

(65) Prior Publication Data

US 2017/0036872 A1  Feb. 9, 2017

(51) Int. Cl.
*B60P 1/00* (2006.01)
*B60R 5/04* (2006.01)
*A61G 21/00* (2006.01)

(52) U.S. Cl.
CPC .............. *B60P 1/003* (2013.01); *B60R 5/041* (2013.01); *A61G 21/00* (2013.01)

(58) Field of Classification Search
CPC .......... B60R 5/041; A61G 21/00; B60P 1/003
USPC ........................................ 414/522; 296/26.09
See application file for complete search history.

(56) References Cited

U.S. PATENT DOCUMENTS

| | | | | |
|---|---|---|---|---|
| 2,573,496 A | * | 10/1951 | Runkle | A61G 21/00 414/522 |
| 2,589,295 A | * | 3/1952 | Schofield | A61G 19/00 414/522 |
| 3,084,816 A | * | 4/1963 | Bozio | B60R 5/04 414/522 |
| 4,685,857 A | * | 8/1987 | Goeser | B60P 1/431 414/522 |
| 4,824,158 A | * | 4/1989 | Peters | B60R 5/04 414/522 |
| 5,098,146 A | * | 3/1992 | Albrecht | B60P 1/52 296/26.09 |
| 5,509,764 A | | 4/1996 | Shives | |

(Continued)

FOREIGN PATENT DOCUMENTS

CA  2631304 A1  11/2009
CN  104553927 A  4/2015
(Continued)

OTHER PUBLICATIONS

Great Britain Search Report dated Dec. 23, 2016, for Great Britain Application No. GB1613245.8, 4 pgs.

(Continued)

*Primary Examiner* — James Keenan

(74) *Attorney, Agent, or Firm* — Brooks Kushman P.C.; Frank Lollo

(57) ABSTRACT

A powered sliding platform assembly may include an actuator, a platform, and a controller. The platform may have a rail defining first and second openings configured to receive a pin of an actuator. The actuator and the rail may be arranged such that while the platform moves between extended and retracted positions, the pin rides along the rail between the openings. The controller may be programmed to, in response to a signal indicative of an object being proximate the platform, inhibit movement of the platform.

19 Claims, 3 Drawing Sheets

(56) References Cited

U.S. PATENT DOCUMENTS

| | | | |
|---|---|---|---|
| 5,649,731 A | 7/1997 | Tognetti | |
| 5,832,555 A * | 11/1998 | Saucier | B60R 3/02 |
| | | | 414/522 |
| 6,065,792 A * | 5/2000 | Sciullo | B60P 1/003 |
| | | | 296/26.09 |
| 6,099,232 A | 8/2000 | Dixon et al. | |
| 6,598,253 B1 * | 7/2003 | Allen | B60P 1/431 |
| | | | 14/69.5 |
| 6,659,524 B1 | 12/2003 | Carlson | |
| 6,783,010 B1 | 8/2004 | Berger | |
| 6,991,277 B1 | 1/2006 | Esler | |
| 7,228,582 B1 * | 6/2007 | Jones | B63B 27/143 |
| | | | 14/69.5 |
| 7,445,263 B1 * | 11/2008 | Bluhm | B60P 1/003 |
| | | | 296/26.09 |
| 7,798,761 B2 * | 9/2010 | Goodrich | B60P 1/43 |
| | | | 414/462 |
| 8,020,911 B2 * | 9/2011 | McKelvey | B60P 1/003 |
| | | | 296/26.09 |
| 8,505,141 B1 * | 8/2013 | Morris | 14/71.1 |
| 8,635,729 B1 | 1/2014 | Johnson et al. | |
| 8,869,333 B2 * | 10/2014 | Johnson | B60P 1/433 |
| | | | 14/71.3 |
| 8,926,254 B2 * | 1/2015 | Pocobello | B60R 3/02 |
| | | | 414/537 |
| 9,022,718 B2 * | 5/2015 | Groth | B62B 1/14 |
| | | | 280/33.997 |
| 9,238,429 B2 * | 1/2016 | Bluhm | F16D 63/008 |
| 10,415,296 B2 * | 9/2019 | Mayr | B60J 5/102 |
| 2003/0099532 A1 * | 5/2003 | Williams | B60P 3/07 |
| | | | 414/538 |
| 2005/0161964 A1 | 7/2005 | Adleman, Jr. | |
| 2006/0033353 A1 | 2/2006 | Bequette | |
| 2006/0051191 A1 * | 3/2006 | Dupuy | B60P 1/4457 |
| | | | 414/522 |
| 2006/0125267 A1 | 6/2006 | Stevenson et al. | |
| 2007/0090661 A1 * | 4/2007 | Shagbazyan | B60J 7/026 |
| | | | 296/26.09 |
| 2007/0210599 A1 * | 9/2007 | Arnold | B60P 1/003 |
| | | | 296/26.09 |
| 2008/0157555 A1 * | 7/2008 | Steele | B60P 7/13 |
| | | | 296/26.09 |
| 2009/0252585 A1 | 10/2009 | Plaganis | |
| 2011/0042164 A1 * | 2/2011 | Clark | B66F 17/006 |
| | | | 182/2.2 |
| 2013/0341949 A1 * | 12/2013 | Bernthisel | B62D 33/0273 |
| | | | 296/26.09 |
| 2014/0219756 A1 * | 8/2014 | Smith | B60P 1/431 |
| | | | 414/537 |
| 2015/0014502 A1 | 1/2015 | McCaughan | |
| 2015/0048642 A1 * | 2/2015 | Williams | B60P 1/6427 |
| | | | 296/26.09 |
| 2016/0107560 A1 * | 4/2016 | Thygesen | B60R 5/041 |
| | | | 296/37.6 |

FOREIGN PATENT DOCUMENTS

| | | | | |
|---|---|---|---|---|
| DE | 102011121410 A1 * | 6/2013 | | E05F 15/70 |
| GB | 2105296 A * | 3/1983 | | |
| JP | 2009221760 A * | 10/2009 | | E05F 15/12 |

OTHER PUBLICATIONS

Chinese Patent Office, Office Action for the corresponding Chinese Patent Application No. 201610642960.7, dated Nov. 1, 2019, 7 pages.

* cited by examiner

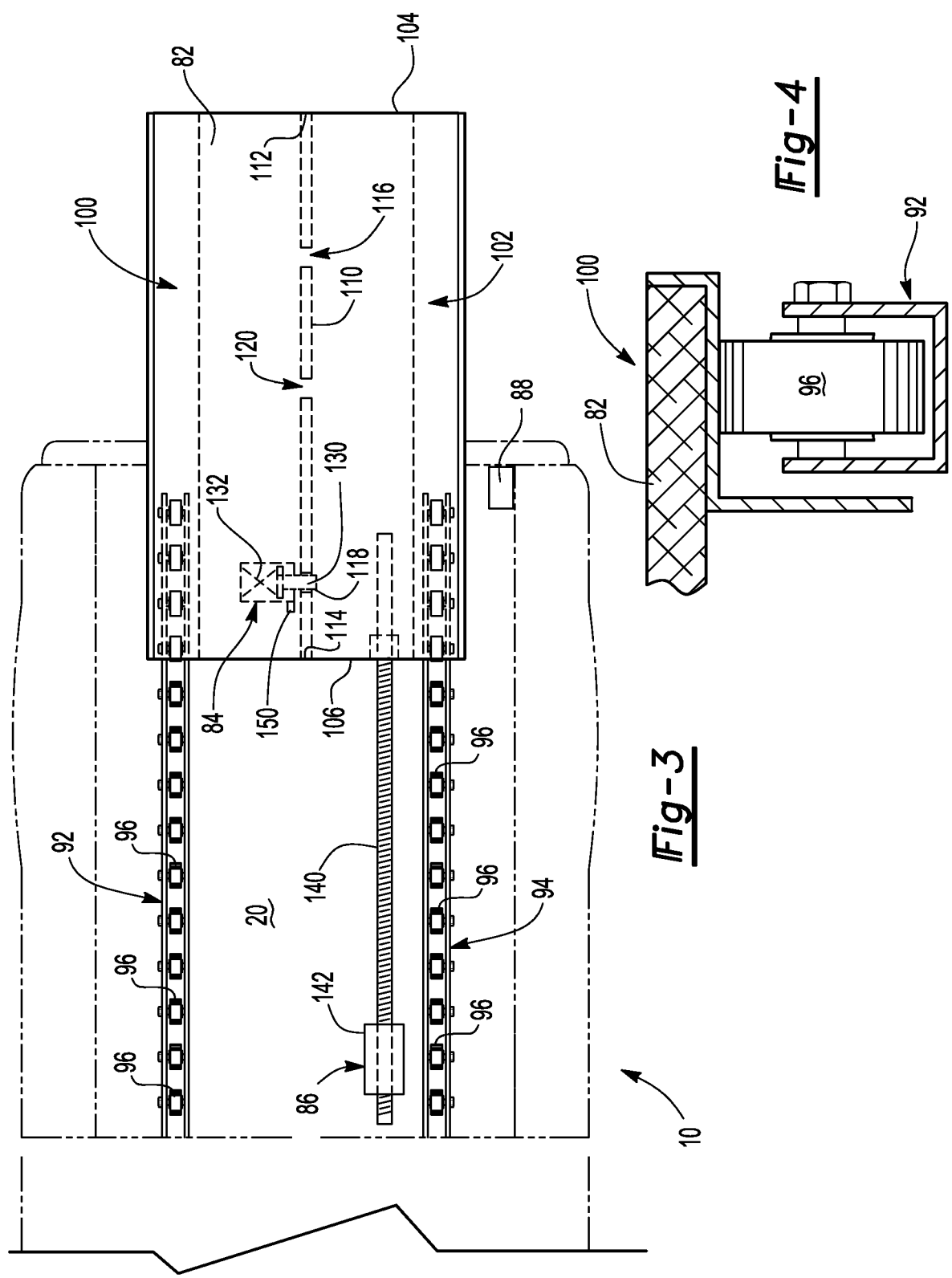

POWERED SLIDING PLATFORM ASSEMBLY

TECHNICAL FIELD

The present disclosure relates to a powered sliding truck bed assembly.

BACKGROUND

Pickup type trucks are provided with a truck bed that is able to receive and store tools and equipment. Removing and reloading the tools and equipment from the truck bed may be time consuming and cumbersome. A sliding platform may be provided in the truck bed area to aid an operator in accessing objects stored within the truck bed. A manually operated sliding platform may be useful to aid in the loading and unloading of objects stored within the truck bed. The manually operated sliding platform may be difficult to operate at times when the sliding platform is heavily loaded or the pickup truck is on an incline or decline.

SUMMARY

A platform assembly may include a platform, an actuator, a rail, and a controller. The platform may be slidably engaged with a track disposed on a bed. The actuator having a pin biased towards an extended position. The rail coupled to the platform and defining first and second openings configured to receive the pin. The controller programmed to operate the actuator to retract the pin to permit movement of the rail as the rail begins to move relative to the track.

A platform assembly may include a platform, a drive assembly, and a controller. The platform may be slidably disposed on a truck bed and define first and second openings configured to receive a pin of an actuator. The drive assembly may be operatively coupled to the platform and may be configured to move the platform between the retracted and extended positions relative to the truck bed. The controller may be programmed to operate the actuator to retract the pin and to operate the drive assembly to translate the platform.

A vehicle may include a truck bed and a powered sliding platform assembly. The powered sliding platform assembly may be disposed on the truck bed and may include an actuator, a platform, and a controller. The actuator may have a pin biased towards an extended position. The platform may have a rail defining first and second openings configured to receive the pin. The actuator and the rail may be arranged such that while the platform moves between extended and retracted positions, the pin rides along the rail between the openings. The controller may be programmed to, in response to a signal indicative of an object being proximate the platform, inhibit movement of the platform.

BRIEF DESCRIPTION OF THE DRAWINGS

FIG. 3 is a partial perspective view of the powered sliding platform assembly.

FIG. 4 is a partial perspective view of an exemplary track and roller system of the powered sliding platform assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
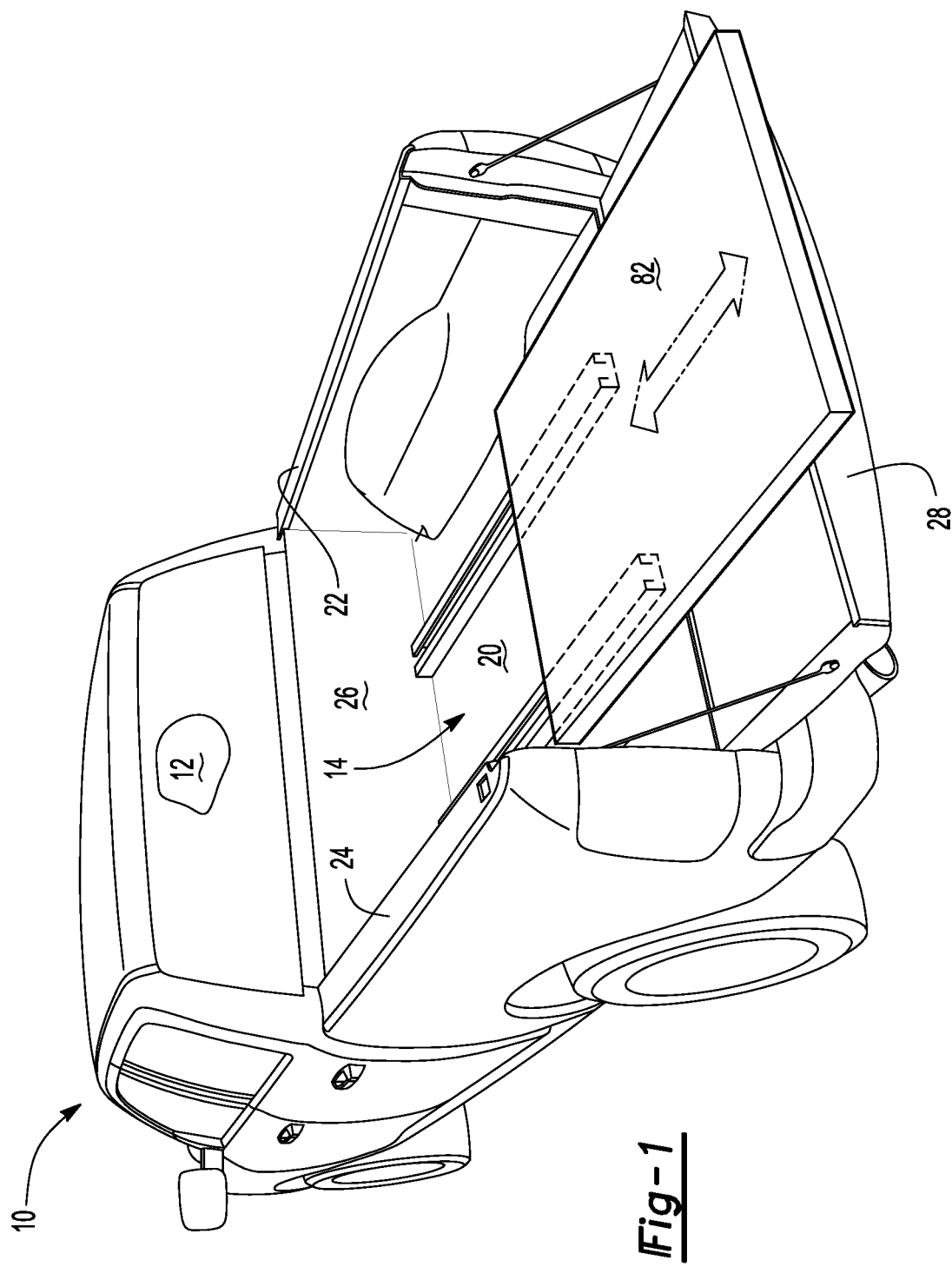
FIG. 1 is a perspective view of a vehicle truck bed having a powered sliding platform assembly.

Referring to FIG. 1, a schematic diagram of a vehicle 10 is illustrated according to an exemplary embodiment of the present disclosure. Physical placement and orientation of the components within the vehicle 10 may vary. Although the vehicle of FIG. 1 will be particularly described, the strategies in accordance with embodiments of the present disclosure may apply to other vehicle configurations.

The vehicle 10 may be configured as a pickup truck. The pickup truck may include a passenger compartment 12 and a truck bed 14 disposed on a vehicle frame. The truck bed 14 may be disposed aft of the passenger compartment 12 or vehicle cab. The truck bed 14 may include a bed floor 20, a first side wall 22, a second sidewall 24, an end wall 26, and a tailgate 28. The first and second sidewalls 22, 24 may extend vertically away from the bed floor 20. The first sidewall 22 may be spaced apart and disposed opposite the second sidewall 24. The end wall 26 may extend vertically away from the bed floor 20 and may connect the first and second sidewalls 22, 24. The end wall 26 may be disposed between the first sidewall 22 and the second sidewall 24. The end wall 26 may be disposed proximate the passenger compartment 12. In at least one embodiment, the end wall 26 may be integrally formed with the passenger compartment 12. The tailgate 28 may be spaced apart and disposed opposite the end wall 26. The tailgate 28 may extend away from the bed floor 20. The tailgate 28 may be articulable and may provide access to cargo disposed within the truck bed 14. The tailgate 28 as shown in FIG. 1 is shown in the open position.

Figure 2:
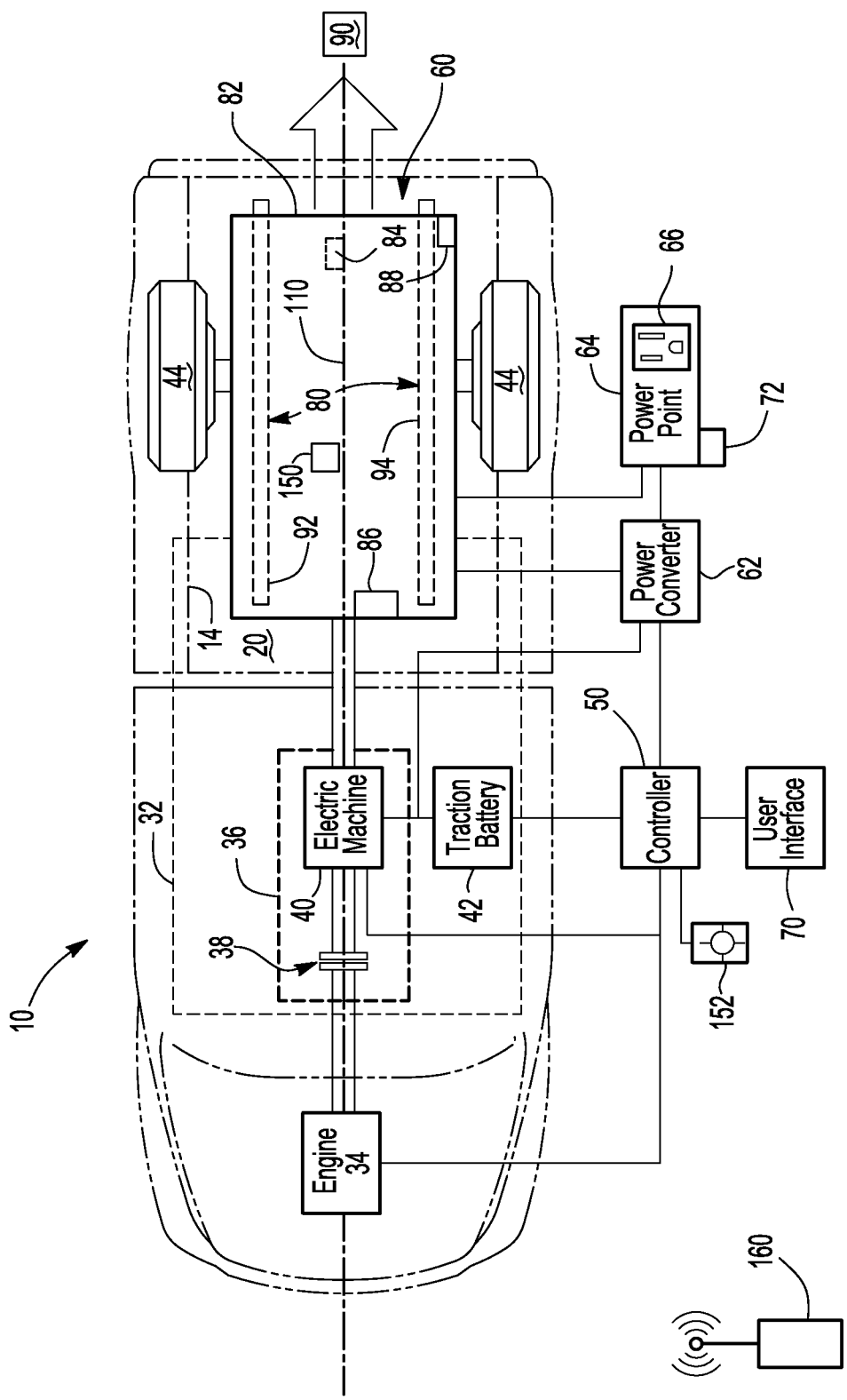
FIG. 2 is a schematic diagram of a vehicle having a power generation mode.

Referring to FIG. 2, the vehicle 10 may include a powertrain 32 having an engine 34 that is selectively connected to a transmission 36. The transmission 36 may include a disconnect clutch 38, an electric machine 40, and an associated traction battery 42.

The engine 34 may be selectively mechanically coupled to the electric machine 40 and the remainder of the transmission 36 by the disconnect clutch 38. The engine 34 and the electric machine 40 may both act as drive sources for the vehicle 10 by providing torque to the vehicle wheels 44. The electric machine 40 may be implemented by any one of a plurality of types of electric machines, such as a permanent magnet synchronous motor.

A controller 50 may be configured to operate the vehicle 10 or powertrain 32 in a plurality of modes. The controller 50 may operate the vehicle 10 in a charge depletion mode in which the engine 34 may be isolated from the remainder of the powertrain 32 via the disconnect clutch 38. In the charge depletion mode, the electric machine 40 may act as the sole drive source for the vehicle 10 using the traction battery 42 as its power source. The controller 50 may operate the vehicle 10 in a charge sustaining mode in which the engine 34 is operatively connected to the remainder of the powertrain 32 via the disconnect clutch 38. In the charge sustaining mode, the engine 34 and electric machine 40 may act as drive sources for the vehicle 10.

The controller 50 may be configured to operate the vehicle 10 or powertrain 32 in a power generation mode in which electric power is supplied to a device. The device may be a powered sliding platform assembly 60. In at least one embodiment, the device may be a device external to the vehicle 10, such as a power tool, a saw, a drill, a welding device, or other device requesting power. The vehicle 10 may include a power converter 62 configured to condition electric power from the traction battery 42 to the powered sliding platform assembly 60. The power converter 62 may be integrated with the traction battery 42 or provided as a separate component as shown in FIG. 2.

The power converter 62 may be a step-down or step-up converter or transformer. In at least one embodiment, the power converter 62 may be a step down converter configured to receive high-voltage AC power from the electric machine 40 or high voltage DC power from the traction battery 42 and provide reduced AC power to a power point 64 in communication with the powered truck bed assembly. In at least one embodiment, the power converter 62 may include an AC transformer to reduce the voltage and a rectifier to convert from AC to DC, and provide reduced DC power to the power point 64 in communication with the powered sliding platform assembly 60.

The power point 64 may include a current sensor and/or a voltage sensor. The sensors may be configured to measure the current and/or voltage provided to the powered sliding platform assembly 60.

The power point 64 may include an electrical connector 66. The electrical connector 66 may be a grounded receptacle or ungrounded receptacle. The receptacle may be similar to a NEMA type 5 or NEMA type 1 receptacle. In at least one embodiment, the electrical connector 66 may be similar to a NEMA type 14 or a JIS C 8303 receptacle. In at least one embodiment, the electrical connector 66 may be a grounded plug or ungrounded plug.

Certain enablement basics may be met prior to the controller 50 operating the vehicle 10 or powertrain 32 in power generation mode such that electrical power is provided to the power point 64. These enablement basics may include the transmission 36 being in a state in which no torque may be transmitted to the vehicle wheels 44 and the vehicle ignition being in an "on" position.

No torque may be transmitted to the vehicle wheels 44 should the transmission 36 be in "park" or "neutral". "Park" may be a transmission state in which the transmission 36 is inhibited from providing output torque to the vehicle wheels 44 by the engagement of a parking pawl or the like to restrict rotation a transmission output shaft. "Neutral" may be a transmission state where the rotation of a transmission output shaft is not restricted, but the vehicle wheels 44 may be restricted from rotating by the application of a parking brake or an emergency brake.

In response to the controller 50 detecting or determining that the transmission 36 is in "park" or "neutral" with the parking brake activated and the ignition in an "on" position, the operator of the vehicle 10 may be permitted to select power generation mode via a user interface 70. In at least one embodiment, a switch 72 may be disposed proximate the power point 64 to enable the operator of the vehicle 10 to activate the power point 64 if the enablement basics are met. In response to the activation of the power generation mode, the traction battery 42 may provide power to the power point 64 and ultimately the powered sliding platform assembly 60.

The powered sliding platform assembly 60 may be disposed within the truck bed 14. The powered sliding platform assembly 60 may be disposed between the first sidewall 22 and the second sidewall 24. The powered sliding platform assembly 60 may be disposed between the end wall 26 and the tailgate 28. The powered sliding platform assembly 60 may include a track assembly 80, a platform 82, an actuator 84, a drive assembly 86, and a proximity sensor 88.

The track assembly 80 may include a first track 92 and a second track 94 disposed proximate the bed floor 20. The first track 92 may be spaced apart from the second track 94. The first track 92 and the second track 94 may be disposed substantially parallel to each other. The first track 92 may be disposed proximate the first sidewall 22. The second track 94 may be disposed proximate the second sidewall 24. The first track 92 and the second track 94 may be mounted directly to the bed floor 20 or may be mounted to a base that may be directly mounted to the bed floor 20. In at least one embodiment, the first track 92 and the second track 94 may be disposed beneath the bed floor 20 such that a portion of the platform 82 is disposed substantially parallel to the bed floor 20. The first track 92 and the second track 94 may be mounted to the bed floor 20 in any suitable manner such as by the fastening, welding, or other joining method.

Referring to FIG. 4, the track assembly 80 may be configured as a track and roller system. The first track 92 and the second track 94 may be provided with rollers 96 that may engage a first portion 100 and a second portion 102 of the platform 82. In at least one embodiment, the first track 92 and the second track 94 may be configured to receive rollers extending from or disposed on the platform 82. In at least one embodiment, the track assembly 80 may be configured as a slide assembly or telescoping assembly to permit relative movement between the track assembly 80 and the platform 82. The first track 92 and the second track 94 may be configured to permit movement of the platform 82 relative to the track assembly 80.

The platform 82 may be disposed within the truck bed 14. The platform 82 may be disposed substantially parallel to the bed floor 20. The platform 82 may be spaced apart from the first sidewall 22, the second sidewall 24, the end wall 26, and the tailgate 28.

The platform 82 may be configured to translate with respect to the truck bed 14 and the track assembly 80. The platform 82 may be slidably engaged with the track assembly 80. More specifically, the first portion 100 of the platform 82 may be slidably engaged with the first track 92 and the second portion 102 of the platform 82 may be slidably engaged with the second track 94. The platform 82 may have a first end 104 disposed proximate the tailgate 28 and may have a second end 106 spaced apart from the first end 104 and disposed proximate the end wall 26.

A rail 110 may be coupled to the platform 82. The rail 110 may extend along a length of the platform 82. The rail 110 may be disposed between the first track 92 and the second track 94 of the track assembly 80. The rail 110 may be disposed between the first portion 100 of the platform 82 and the second portion 102 of the platform 82. The rail 110 may have a first end 112 disposed proximate the first end 104 of the platform 82. The rail 110 may have a second end disposed proximate the second end 106 of the platform 82. The rail 110 may have a generally elongate body extending between the first end 112 and the second end 114. In at least one embodiment, a first rail spaced apart from a second rail extending along a length of the platform 82.

The rail 110 may define a first opening 116 and a second opening 118. The first opening 116 may be disposed proximate the first end 112 and the second opening 118 may be disposed proximate the second end 114. The first opening 116 and the second opening 118 may be configured as a through hole or a recess. The first opening 116 may correspond to a retracted position of the platform 82 where the first end 104 of the platform 82 is disposed within the truck bed 14. The second opening 118 may correspond to and extended position of the platform 82 when the first end 104 of the platform 82 may be disposed outside of the truck bed 14. In at least one embodiment, the first opening 116 and the second opening 118 may be defined by the platform 82.

Additional openings may be defined within the platform 82 or the rail 110 to define a plurality of intermediate positions of the platform 82. For example, the first opening 116 may correspond to a position where the platform 82 is fully retracted within the truck bed 14. The second opening 118 may correspond to a position where the platform 82 is fully extended and may act as a stop to inhibit further extension of the platform 82 outside of the truck bed 14. An intermediate opening 120 may be disposed between the first opening 116 and the second opening 118 and may correspond to an intermediate position. The intermediate position may be a position of a plurality of positions of the platform 82 between the fully retracted position and the fully extended position of the platform 82. In at least one embodiment, the rail 110 may be configured as discrete tabs wherein a first tab defining the first opening 116 may be disposed proximate the first end 104 of the platform 82 and a second tab defining the second opening 118 may be disposed proximate the second end 106 of the platform 82.

The first opening 116 may include a first ramped surface and a second ramped surface diametrically spaced apart from the first ramped surface. The first ramped surface may be inclined towards the first end 112 of the rail 110 and the second ramped surface may be inclined towards the second end 114 of the rail 110. The second opening 118 may include a first ramped surface and a second ramped surface diametrically spaced apart from the first ramped surface. The first ramped surface may be inclined towards the first end 112 of the rail 110 and the second ramped surface may be inclined towards the second end 114 of the rail 110.

The actuator 84 may be disposed proximate the tailgate 28 and disposed on the bed floor 20. The actuator 84 may be disposed proximate the first end 104 of the platform 82 when the platform 82 is in the retracted position. The actuator 84 may be disposed proximate the second end 106 of the platform 82 when the platform 82 is in the fully extended position. In at least one embodiment, more than one actuator may be provided and may be disposed on opposite sides of the rail 110 and configured to operate simultaneously to selectively inhibit movement of the platform 82. The actuator 84 may include a locking bolt or a pin 130 and an actuator biasing member 132. The actuator biasing member 132 may be configured to bias the pin 130 towards an extended position. The actuator biasing member 132 may be a linear spring or the like. The actuator 84 may be a solenoid, a retractable pin mechanism, or the like.

The controller 50 may be programmed to selectively operate the actuator 84. The controller 50 may be configured to selectively power or activate the actuator 84 to maintain the pin 130 in the extended position. The controller 50 may be configured to selectively power or activate the actuator 84 to retract the pin 130. The retraction of the pin 130 may permit movement of the rail 110 relative to the truck bed 14 or the track assembly 80. The pin 130 may be retracted within the actuator body such that there is no contact between the rail 110 and the pin 130 as the platform 82 and/or the rail 110 moves between the retracted and the extended position or between the extended position and the retracted position. In at least one embodiment, the controller 50 may command the actuator 84 to release the pin 130 as the platform 82 and/or the rail 110 begins to move relative to the track assembly 80. As such, the pin 130 may be configured to ride along the body of the rail 110 as the platform 82 moves between the retracted position and the extended position or between the extended position and the retracted position. As the pin 130 rides along the body of the rail 110, the body of the rail 110 may force the pin 130 to at least partially retract within the actuator 84.

The first opening 116 and the second opening 118 may be configured to receive the pin 130. The first ramped surface and a second ramped surface may aid in the pin 130 being received within at least one of the first opening 116 and the second opening 118. The platform 82, the actuator 84, and the rail 110 may be arranged such that the pin 130 is received within the first opening 116 when the platform 82 is in the fully retracted position. The platform 82, the actuator 84, and the rail 110 may be arranged such that the pin 130 is received within the second opening 118 when the platform 82 is in the fully extended position. The platform 82, the actuator 84, and the rail 110 may be arranged such that the pin 130 is received within the intermediate opening 120 when the platform 82 is in the intermediate position.

The drive assembly 86 may be operatively coupled to the platform 82. The drive assembly 86 may be configured to move the platform 82 to and between various positions of the platform 82. The drive assembly 86 may be at least partially disposed on the bed floor 20. The drive assembly 86 may include a drive mechanism 140 and a drive motor 142. The drive mechanism 140 may be engaged with the platform 82. In response to operation of the drive motor 142, the drive mechanism 140 may operate to translate the platform 82 from the fully retracted position to the extended position or intermediate position. The drive mechanism 140 may operate to translate the platform 82 from the extended position to the retracted position or intermediate position.

The drive mechanism 140 may be a ball screw, worm gear, screw drive, or the like operatively connected to the drive motor 142. The operation of the drive motor 142 may operate the drive mechanism 140 to translate the platform 82 relative to the track assembly 80. The controller 50 may monitor the drive motor 142 temperature, current, torque, rotational speed, or acceleration to ensure that the drive motor 142 is functional. In at least one embodiment, the drive assembly 86 may be pneumatic, hydraulic, or electromechanical linear actuator configured to translate the platform 82 relative to the track assembly 80. The drive assembly 86 may be configured to translate the platform 82 at a substantially constant rate between various positions. The controller 50 may be configured to vary the rate of translation, translation speed, or rate of movement of the platform 82 by the drive assembly 86 based on signals provided by a position sensor 150 and a vehicle slope sensor 152.

The position sensor 150 may be disposed proximate the platform 82. The position sensor 150 may be disposed proximate the rail 110. In at least one embodiment, the position sensor 150 may be disposed proximate the platform 82, the actuator 84, and the rail 110. The position sensor 150 may be a hall effect sensor, track position sensor, or the like, configured to provide a signal indicative of the position of the platform 82 relative to the track assembly 80 or the truck bed 14. In at least one embodiment, the position sensor 150 may be configured to provide a signal indicative of the position of the first opening 116 and/or the second opening 118 relative to the pin 130 of the actuator 84 to the controller 50. The position sensor 150 may be configured to track the position of the first opening 116 or the second opening 118 to ensure that the pin 130 may be able to engage at least one of the openings to inhibit further movement of the platform 82 relative to the truck bed 14 or the track assembly 80. In at least one embodiment, the controller 50 may be configured to detect the position of the platform 82 relative to the truck bed 14 or the track assembly 80 and output the position of the platform 82 for display via the user interface 70.

The controller 50 may be programmed to reduce the rate of translation of the platform 82 as at least one of the first opening 116 and the second opening 118 moves proximate the pin 130 of the actuator 84. The reduction in the rate of translation of the platform 82 may further ensure that pin 130 may engage at least one of the first opening 116 in the second opening 118 or the intermediate opening 120. The controller 50 may be programmed to operate the actuator 84 to lock the pin 130 in the extended position in response to the pin 130 being received within at least one of the first opening 116, the second opening 118, and the intermediate opening 120.

The vehicle slope sensor 152 may be a standalone sensor or a member of a vehicle module such as the restraint module, ABS module, or suspension control module. The vehicle slope sensor 152 may be a roll sensor, pitch sensor, or yaw sensor configured to provide a signal indicative of vehicle slope or vehicle inclination to the controller 50. The controller 50 may inhibit operation of the powered sliding platform assembly 60 in response to the signal indicative of vehicle inclination greater than a threshold vehicle slope or a threshold vehicle inclination. In at least one embodiment, the controller 50 may output for display via the user interface 70 a warning indicative of a vehicle slope or a vehicle inclination greater than a threshold vehicle slope or vehicle inclination. For example, should a vehicle inclination from front to back, side to side, or a combination thereof be greater than a threshold, the controller 50 may prompt an operator of the vehicle 10 to find a more level surface, inhibit operation of the powered sliding platform assembly 60, or prompt the user to check possible shifting a vehicle cargo within the truck bed 14. In response to the vehicle inclination becoming less than the threshold vehicle inclination, the controller 50 may remove the warning and output for display an indicator indicating that the powered sliding platform assembly 60 may be operated. For example, the controller 50 may permit operation of the powered sliding platform assembly 60 in response to the signal indicative of vehicle inclination indicating a vehicle inclination less than the threshold vehicle inclination.

The proximity sensor 88 may be disposed proximate at least one of the first end 104 and the second end 106 of the platform 82. The proximity sensor 88 may be disposed on the bed floor 20 proximate the tailgate 28. The proximity sensor 88 may be configured as an object detection sensor. The object detection sensor may be a camera or vision system, a rearward looking sensor, or combination thereof. The object detection sensor may be at least one of an ultrasonic sensor, a light detection and ranging (LIDAR) device, radio detection and ranging (RADAR) device, laser scanner, or a combination thereof. The number, type, and/or the positioning of the proximity sensor 88 may vary based on the vehicle application. The proximity sensor 88 may be configured to provide a signal indicative of an object 90 proximate a path of travel of the platform 82 to the controller 50. The object 90 proximate a path of travel of the platform 82 may be the tailgate 28, a person, foreign object, or other obstacle.

The controller 50 may be programmed to permit movement of the platform 82 relative to the track assembly 80, in response to the proximity sensor 88 providing a signal indicative of a clear path of travel of the platform 82. The controller 50 may permit operation of the actuator 84 and/or the drive assembly 86 to permit movement of the platform 82. The controller 50 may be programmed to inhibit movement of the platform 82 relative to the track assembly 80, in response to the proximity sensor 88 providing a signal indicative of an object 90 proximate a path of travel of the platform 82. The controller 50 may inhibit operation of the actuator 84 and/or the drive assembly 86 to inhibit movement of the platform 82.

The controller 50 may be programmed to, while the platform 82 moves between the retracted position and the extended position, in response to the proximity sensor 88 providing a signal indicative of an object 90 proximate a path of travel of the platform 82, to stop movement of the platform 82. The movement of the platform 82 may be stopped by ceasing operation of the drive assembly 86. In at least one embodiment, the controller 50 may be programmed to operate the drive assembly 86 to retract the platform 82 towards the retracted position such that the first end 104 of the platform 82 is within a predetermined distance from the object 90 proximate the path of travel of the platform 82. In at least one embodiment, the controller 50 may be programmed to in response to a binding of the track assembly 80, a binding of a component of the drive assembly 86, or a foreign object disposed between the truck bed 14 and the platform 82, to move the platform 82 in a direction opposite the current direction of travel. In at least one embodiment, the controller 50 may be programmed to operate the drive assembly 86 to retract the platform 82 towards the retracted position a predetermined distance or predetermined amount from the object.

The controller 50 may suspend operation of the drive assembly 86 at least until the object 90 is no longer proximate the path of travel of the platform 82. The controller 50 may be programmed to, in response to the object 90 proximate a path of travel of the platform 82 being clear and an operator reinitiating operation of the powered sliding platform assembly 60, to translate the platform 82 towards an extended position or a retracted position. In at least one embodiment, the controller 50 may be programmed to, in response to the proximity sensor 88 providing a signal indicative of the tailgate 28 being in a closed position or a switch proximate the tailgate 28 providing a signal indicative of the tailgate 28 in a closed position, to output for display via the user interface a warning indicative of the closed tailgate 28. The warning may prompt an operator of the vehicle 10 to open the tailgate 28 prior to operating the powered sliding platform assembly 60.

A remote device 160 may be provided to control operation of the powered sliding platform assembly 60. The remote device 160 may be configured to receive a user input to operate the powered sliding platform assembly 60. The remote device 160 may be configured as a key fob, a remotely located switch, an indicator provided by the user interface 70, or other remote control device that may provide a signal to the controller 50 to operate the powered sliding platform assembly 60.

The controller 50 may be programmed to verify certain enablement basics prior to permitting operation of the powered sliding platform assembly 60 to move from a retracted position to an extended position or an extended position to a retracted position. The enablement basics may be a combination of: the transmission 36 in "park" or the transmission 36 in "neutral" with the parking brake activated, the vehicle ignition in an "on" position, the vehicle 10 operating in power generation mode, a state of charge of the traction battery 42 greater than a threshold, the proximity sensor 88 providing a signal indicative of an object not proximate a path of travel of the platform 82, the position sensor 150 providing a signal indicative of the pin 130 engaged with at least one of the first opening 116 and the second opening 118, the vehicle slope sensor 152 providing a signal indicative of a vehicle inclination less than a threshold vehicle inclination, the temperature of the drive motor 142 less than a threshold, or other possible enablement basics.

Should the enablement basics not be verified, the controller 50 may output for display via the user interface 70 an indicator that the powered sliding platform assembly 60 may not be operated. In at least one embodiment, the indicator may provide information as to which enablement basic(s) has not been satisfied. The controller 50 may output an indicator indicative of the operation of the powered sliding platform assembly 60, in response to satisfaction of the enablement basic(s). The indicator may be output via the user interface 70 and/or an auditory device. The auditory device may provide an auditory signal prior to the release of the pin 130 by the actuator 84 from at least one of the first opening 116 and the second opening 118. The auditory signal may continue to be provided by the auditory device while the platform 82 translates relative to the track assembly 80. In response to the pin 130 engaging at least one of the first opening 116 and the second opening 118 after translation of the platform 82, the auditory signal may no longer be provided.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A platform assembly of an automotive vehicle comprising:
    a platform slidably engaged with a track disposed on a bed of the automotive vehicle, wherein the platform is constrained for translational movement in a plane from a retracted position to an extended position;
    an actuator having a pin biased towards an extended position;
    a rail coupled to the platform and defining first and second openings configured to receive the pin;
    a vehicle slope sensor configured to provide a signal indicative of a vehicle slope of the automotive vehicle; and
    a controller of the automotive vehicle programmed to
        operate the actuator to retract the pin to permit movement of the rail as the rail begins to move relative to the track, and
        in response to the signal being indicative of a vehicle slope greater than a threshold vehicle slope, inhibit retraction of the pin such that movement of the rail is inhibited.

2. The platform assembly of claim 1 wherein the first opening corresponds to a retracted position of the platform and the second opening corresponds to an extended position of the platform.

3. The platform assembly of claim 2 further comprising a drive assembly operatively coupled to the platform and configured to move the platform between the retracted position and the extended position.

4. The platform assembly of claim 3 wherein the platform includes a first end disposed proximate a tailgate of the automotive vehicle and a second end spaced apart from the first end and disposed proximate a cab of the automotive vehicle.

5. The platform assembly of claim 4 further comprising a proximity sensor disposed proximate at least one of the first end and the second end and configured to provide a signal indicative of an object being proximate a path of travel of the platform.

6. The platform assembly of claim 5 wherein the controller is further programmed to, while the platform moves between the retracted position and the extended position and in response to the proximity sensor providing a signal indicative of an object being within the path of travel of the platform, cease movement of the platform within a predetermined distance of the object.

7. The platform assembly of claim 2 wherein the rail and actuator are arranged such that while the platform moves between the retracted position and the extended position, the pin rides along a body of the rail as the rail moves relative to the track.

8. The platform assembly of claim 1 wherein the vehicle slope sensed by the vehicle slope sensor is a combination of vehicle inclination from front to back and side to side.

9. A platform assembly of a truck comprising:
    a platform slidably disposed on a bed of the truck and defining first and second openings configured to receive a pin of an actuator, wherein the platform is constrained for translational movement in a plane from a retracted position to an extended position;
    a drive assembly operatively coupled to the platform and configured to move the platform between retracted and extended positions relative to the truck bed; and
    a controller of the truck programmed to
        operate the actuator to retract the pin,
        operate the drive assembly to translate the platform,
        while the platform moves between the retracted position and the extended position and in response to a signal indicative of an object being within a predetermined distance from the platform, stop translation of the platform and release the pin, and
        in response to a signal from a slope sensor indicating a slope of the truck greater than a threshold slope, inhibit retraction of the pin such that movement of the platform from the retracted position is inhibited.

10. The platform assembly of claim 9 wherein the first opening corresponds to a retracted position of the platform and the second opening corresponds to an extended position of the platform.

11. The platform assembly of claim 9 wherein the pin of the actuator is biased towards an extended position.

12. The platform assembly of claim 9 wherein the controller is further programmed to, in response to a signal indicative of the pin being proximate at least one of the first opening and the second opening, reduce a rate of translation of the platform.

13. The platform assembly of claim 9 wherein the controller is further programmed to operate the platform to translate the platform a predetermined amount away from the object.

14. A vehicle comprising:
    a truck bed; and
    a powered sliding platform assembly disposed on the truck bed and including
        an actuator having a pin biased towards an extended position,
        a platform having a rail defining first and second openings configured to receive the pin, wherein the platform is constrained for translation in a plane between a retracted position and an extended position, and wherein the actuator and rail are arranged such that while the platform moves in the plane between the extended and retracted positions, the pin rides along the rail between the first and second openings, and a controller programmed to, (i) in response to a signal indicative of an object being proximate the platform, inhibit movement of the platform, and (ii) in response to a signal from a vehicle slope sensor indicating a slope of the vehicle greater than a threshold vehicle slope, inhibit retraction of the pin such that movement of the platform from the retracted position is inhibited.

15. The vehicle of claim 14 wherein the controller is further programmed to operate the actuator to retract the pin and operate a drive assembly to translate the platform from the retracted position towards the extended position.

16. The vehicle of claim 15 wherein the controller is further programmed to, while the drive assembly moves the platform towards the extended position and in response to a signal indicative of an object being proximate the platform, stop the platform and move the platform towards the retracted position at least until the object is within a predetermined distance from the platform.

17. The vehicle of claim 15 wherein the controller is further programmed to, in response to a signal indicative of the pin being proximate at least one of the first opening and the second opening, vary a rate of movement of the platform.

18. The vehicle of claim 14 wherein the controller is further programmed to, in response to the signal indicative of an object being proximate the platform, output for display a warning indicative of the object being proximate the platform.

19. The vehicle of claim 14 wherein the vehicle slope sensor comprises at least one of a roll sensor, a pitch sensor, and a yaw sensor for the vehicle; wherein the signal from the vehicle slope sensor is indicative of a combination of vehicle inclination from front to back and side to side, and wherein the controller is further programmed to, in response to the vehicle slope being greater than the threshold vehicle slope, prompt an operator of the vehicle to find a more level surface.

* * * * *